(12) United States Patent
Jones et al.

(10) Patent No.: US 10,410,449 B2
(45) Date of Patent: Sep. 10, 2019

(54) SYSTEMS AND METHODS FOR PROVIDING ACCESS TO A SECURED CONTAINER

(71) Applicant: Walmart Apollo, LLC, Bentonville, AR (US)

(72) Inventors: Nicholaus Adam Jones, Fayetteville, AR (US); Aaron Vasgaard, Fayetteville, AR (US); Matthew Allen Jones, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 15/958,580

(22) Filed: Apr. 20, 2018

(65) Prior Publication Data

US 2018/0322719 A1    Nov. 8, 2018

Related U.S. Application Data

(60) Provisional application No. 62/501,465, filed on May 4, 2017.

(51) Int. Cl.
*G07C 9/00* (2006.01)
*A47F 3/00* (2006.01)
(Continued)

(52) U.S. Cl.
CPC .......... *G07C 9/00309* (2013.01); *A47F 3/002* (2013.01); *G06Q 20/40145* (2013.01);
(Continued)

(58) Field of Classification Search
CPC ............... G07C 9/00; H04W 4/02; A47F 3/00
(Continued)

(56) References Cited

U.S. PATENT DOCUMENTS

| 4,866,661 A | 9/1989 | de Prins |
| 5,745,036 A * | 4/1998 | Clare .................. G07G 1/0054 235/375 |

(Continued)

FOREIGN PATENT DOCUMENTS

| WO | 2007/079332 A2 | 7/2007 |
| WO | 2014/168955 A2 | 10/2014 |

OTHER PUBLICATIONS

Boden, South Korean store launches smart shopping experience. NFC World. Retrieved online at: http://www.nfcworld.com/2016/10/07/347724/47724/. Dec. 30, 2016. 4 pages.

(Continued)

*Primary Examiner* — Nam V Nguyen
(74) *Attorney, Agent, or Firm* — McCarter & English, LLP; David R. Burns

(57) ABSTRACT

Systems and methods are described that provide access to secured containers in a facility. The systems and methods unlock a lock securing the container in response to receiving identifying information for an individual seeking access to the secured container. If objects are removed from the secured container by the individual, the systems and methods can determine whether an authorization was received for the removed objects within a time period. If the authorization is not received, the systems and methods can issue an alert including the identifying information using an alert system.

21 Claims, 5 Drawing Sheets

(51) Int. Cl.
*G06Q 20/40* (2012.01)
*G07F 9/02* (2006.01)
*G07F 17/12* (2006.01)
*G06Q 30/06* (2012.01)
*E05B 47/00* (2006.01)

(52) U.S. Cl.
CPC ......... *G07C 9/00563* (2013.01); *G07F 9/026* (2013.01); *G07F 17/12* (2013.01); *E05B 2047/0095* (2013.01); *G06Q 30/0641* (2013.01); *G07C 2009/00095* (2013.01)

(58) Field of Classification Search
USPC ...... 340/10.1–10.5, 5.61, 5.92, 572.1, 568.1; 235/383; 705/26.62, 27.1, 27.2
See application file for complete search history.

(56) References Cited

U.S. PATENT DOCUMENTS

| | | | |
|---|---|---|---|
| 5,886,634 A * | 3/1999 | Muhme | G07C 9/00111 |
| | | | 340/5.31 |
| 6,850,147 B2 | 2/2005 | Prokoski et al. | |
| 6,909,356 B2 * | 6/2005 | Brown | G06Q 10/087 |
| | | | 340/5.2 |
| 6,989,749 B2 * | 1/2006 | Mohr | G06Q 10/087 |
| | | | 235/385 |
| 7,005,988 B2 * | 2/2006 | Mathewson, II | G06Q 20/202 |
| | | | 235/383 |
| 7,319,395 B2 * | 1/2008 | Puzio | G08B 13/14 |
| | | | 340/10.1 |
| 7,780,081 B1 | 8/2010 | Liang | |
| 8,401,915 B1 | 3/2013 | Kim | |
| 8,452,868 B2 * | 5/2013 | Shafer | G08B 13/2402 |
| | | | 340/568.1 |
| 8,477,033 B2 * | 7/2013 | Claudatos | G06Q 20/203 |
| | | | 340/10.1 |
| 8,847,761 B1 * | 9/2014 | Claudatos | G06Q 20/203 |
| | | | 235/375 |
| 8,963,717 B2 | 2/2015 | Mohiuddin et al. | |
| 9,092,770 B2 | 7/2015 | McCauley et al. | |
| 9,734,643 B2 * | 8/2017 | Hanson | G07C 9/00039 |
| 2013/0110657 A1 * | 5/2013 | Forster | G06Q 20/20 |
| | | | 705/17 |
| 2013/0284806 A1 * | 10/2013 | Margalit | G06Q 30/06 |
| | | | 235/382 |
| 2014/0222603 A1 | 8/2014 | Hay | |
| 2015/0088698 A1 | 3/2015 | Ackerman | |
| 2016/0012496 A1 | 1/2016 | Hanson et al. | |
| 2017/0011606 A1 * | 1/2017 | Ceccon | G08B 13/246 |

OTHER PUBLICATIONS

Business Wire, Accuride International Luanches Senseon Secure Access, Transforming Lock and Key Systems for Commercial Environments. 2 pages. Sep. 14, 2016.
International Search Report and Written Opinion for Application No. PCT/US2018/028540, dated Jul. 9, 2018. 12 pages.

* cited by examiner

SYSTEMS AND METHODS FOR PROVIDING ACCESS TO A SECURED CONTAINER

RELATED APPLICATIONS

This application claims priority to U.S. Provisional Application No. 62/501,465, filed May 4, 2017, the entire contents of which is incorporated herein by reference.

BACKGROUND

High-value objects in a facility are often held in secure containers to prevent theft.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
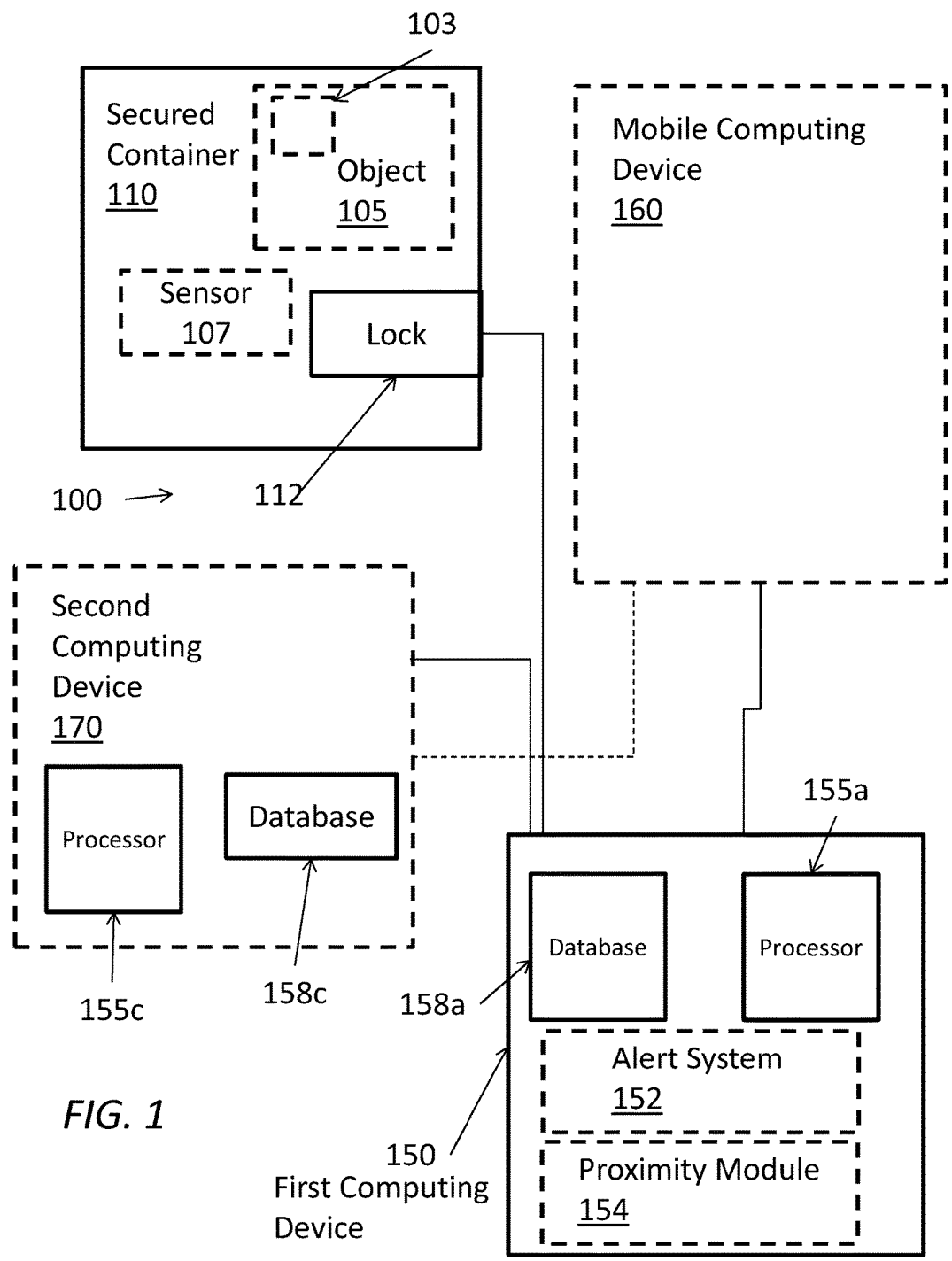
FIG. 1 illustrates a block diagram of a system to provide access to a secured container according to embodiments of the present disclosure.

Described in detail herein are methods and systems for providing access to a secured container. The methods and systems obtain identifying information for an individual seeking access to the secured container. For example, the identifying information can be an image of the individual or biometric information such as fingerprints. The systems and methods can provide the individual access to the secured container and determine whether the individual has removed an object from the secured container. The systems and methods can determine whether an authorization has subsequently been received for the removed objects and if not, can issue an alert including the identifying information using an alert system.

As used herein, a "secured container" is an enclosure enclosing an interior volume and having means to control access to the interior volume. For example, the secured container can be a container having a lock that prevents or allows opening of a door. In some embodiments, the secured container can be a locked display case in a retail environment. The locked display case can have one or more transparent panels or windows to allow an individual to see objects inside the locked display case from one or more directions.

To limit access to high-value objects in a facility, the high-value objects may be placed in secured containers, for example, a container with a lock. Although this arrangement allows the objects to be displayed to individuals and provides a deterrent to theft, an employee or other entity associated with the facility generally must be present to retrieve an object from the secured container for an individual. Thus, placement of objects in secured containers requires additional manpower to retrieve objects for individuals. In addition, this arrangement sometimes provides a sufficient impediment to the individual that the individual may choose to forego retrieving the object in light of the time and interaction needed to do so. In some instances, this can lead to reduced sales of objects held in secured containers. Systems and methods described herein can provide access to secured containers directly to the individual without the need for employee intervention.

Conventional systems that provide access to containers or lockers have required individuals to register personal information with the system in advance before access will be granted. For example, the individual may have been required to download and register a smartphone application. As part of the registration process, the individual would often be asked to provide biographical information or information related to methods of purchasing. The step of pre-registration can be inconvenient for individuals, require that users supply devices such as smartphones, or raise privacy concerns. These considerations can lead to low rates of pre-registration. In accordance with various embodiments, systems and methods described herein advantageously do not require pre-registration of the individual.

The systems and methods described herein provide a balance between the level of interaction imposed on the individual and protection of the facility's interests in preventing theft. By receiving identifying information associated with the individual before allowing access to secured containers, the facility has high assurance that they can directly identify a responsible individual should the object be stolen from the facility. The systems and methods described herein can issue an alert including the identifying information if the removal of the object is not authorized (e.g., by receipt of payment) within a period of time.

FIG. 1 illustrates a block diagram of a system 100 for providing access to a secured container 110 in a facility in accordance with various embodiments of the present application. The system 100 can include a container 110 secured by a lock 112 that encloses one or more objects 105. In some embodiments, each of the one or more objects 105 can include a unique identifying code 103. The system can also include a first computing device 150 communicatively coupled to the lock 112 and including a processor 155*a*. In some embodiments, the system 100 can include a second computing device 170. In some embodiments, the system 100 can include a mobile computing device 160. In other embodiments, the system can communicate with the mobile computing device 160 provided by the individual or a third-party. The system 100 can provide access to the secured container 110 in exchange for identifying information for the individual seeking access. The identifying information can be received by the first computing device 150 through communication with the mobile computing device 160. The first computing device 150 can also communicate with a second computing device 170 to determine if an authorization was received within a time period for objects removed from the secured container 110. In addition, the first computing device 150 can provide the identifying information as part of an alert using an alert system 152 if an authorization is not subsequently received within a time period.

The processor 155*a* can be configured to execute instructions to communicate with the mobile computing device 160 to receive identifying information for the individual seeking access to the secured container 110 and a computing device identifier. After receiving the identifying information and computing device identifier, the processor 155*a* can execute instructions to determine whether the individual has removed at least one of the objects 105 from the secured container. If the individual has taken at least one of the objects 105, the processor 155a can execute instructions to communicate with the second computing device 170 to determine whether an authorization associated with the computing device identifier was received for the removed objects within a time period. If the authorization was not received within the time period, the processor 155a can execute instructions to issue an alert including the identifying information using an alert system 152.

The secured container 110 can be different sizes in different embodiments. In some embodiments, the secured container 110 can be an enclosed box. In other embodiments, the secured container 110 can include a portion or all of a room. The lock 112 that secures the container 110 can include a mechanical, magnetic, or other suitable locking mechanism. The first computing device 150 can communicate with the lock 112 to cause the locking mechanism to lock or unlock. For example, the processor 155a of the first computing device 150 can execute instructions to lock the lock securing the container 110 after determining that one or more objects 105 have been placed into the secured container, after determining that one or more objects 105 have been removed from the secured container, or after a time period has passed since an instruction to unlock the lock was executed.

The exemplary first computing device 150 is described in greater detail below with reference to FIG. 4. The processor 155a of the first computing device 150 can execute instructions to communicate with the mobile computing device 160 to receive identifying information for the individual seeking access to the container 110. For example, the first computing device 150 and the mobile computing device 160 can communicate using wireless transmissions conforming to one or more communications standards including, but not limited to, BlueTooth™, Wi-Fi (e.g., various 802.11x standards), near-field communication, or any other suitable standard. In some embodiments, the identifying information can be received by the first computing device 150 via short message service (SMS). In some embodiments, communications between the first computing device 150 and the mobile computing device 160 can be direct or can be mediated through a network as described in greater detail below with reference to FIG. 5.

In some embodiments, the mobile computing device 160 can be a smartphone, tablet, or laptop computer. In various embodiments, the mobile computing device 160 can be provided by the individual or the facility. In accordance with various embodiments, the mobile computing device 160 can include an application that facilitates communication with the first computing device 150. The mobile computing device 160 can include a display. In some embodiments, the processor 155a of the first computing device 150 can execute instructions to provide navigation information to the mobile computing device 160 to guide the individual to the secured container 110 within the facility. For example, the navigation information can include turn-by-turn directional data based upon the individual's location within the facility, a store map, or GPS coordinates corresponding to a location of the secured container 110.

In various embodiments, the identifying information received from the mobile computing device 160 by the first computing device 150 can include images or biometric data related to the individual. For example, the identifying information can include an image of, or image related to, the individual obtained using an imaging device of the mobile computing device 160. As another example, the identifying information can include fingerprint information obtained using a fingerprint scanner of the mobile computing device 160. In some embodiments, the processor 155a of the first computing device 150 can execute instructions to validate the identifying information upon receipt. For example, the processor 155a can execute an image analytics module to verify that the image includes features associated with a human. If the image does not pass validation, the processor 155a can communicate with the mobile computing device 160 to request additional identifying information such as a new image. In some embodiments, the first computing device 150 and the mobile computing device 160 do not require pre-registration of the individual.

In some embodiments, the processor 155a can execute instructions to communicate with the mobile computing device 160 to receive the computing device identifier. In various embodiments, the computing device identifier can be a unique identifier associated with the mobile computing device 160. For example, the computing device identifier can be an international mobile equipment identity (IMEI) number, a media access control (MAC) address, or a serial number associated with the mobile computing device 160. In other embodiments, the computing device identifier can be generated uniquely on a per-session basis by the mobile computing device 160. In some embodiments, the first computing device 150 can store the identifying information or computing device identifier in a database 158a.

The processor 155a can execute instructions to unlock the lock 112 securing the container 110 after receiving the identifying information and the computing device identifier. In some embodiments, the first computing device 150 can include a proximity module 154 to detect the presence of the mobile computing device 160. For example, the proximity module 154 can include short-range communications capability based on BlueTooth™ or near-field communication technology. In such embodiments, communication between the proximity module 154 and the mobile computing device 160 can establish that the individual is in close physical proximity to the secured container. In some embodiments, the first computing device 150 can use the proximity module 154 to unlock the lock 112 as the individual physically approaches the secured container 110.

The processor 155a can execute instructions to determine whether the individual has removed at least one of the objects 105 from the secured container 110. In some embodiments, the secured container 110 can include one or more sensors 107 to detect the presence or absence of objects 105 within the secured container 110. For example, the one or more sensors 107 can include a visual sensor such as an imaging device, a physical sensor such as a weight scale, or an electronic sensor such as a radio-frequency identification reader. In some embodiments, the first computing device 150 can use the one or more sensors 107, at least in part, to determine whether the individual has removed one or more objects 105 from the secured container 110.

In some embodiments, each object 105 within the secured container 110 can be associated with a unique identifying code 103. In some embodiments, the unique identifying code 103 can be a serialized barcode or a radio-frequency identification device (RFID). In some embodiments, the unique identifying code 103 of the object 105 being removed by the individual from the secured container 110 can be identified by the secured container 110, for example, using the one or more sensors 107. For example, the one or more sensors 107 can include a barcode reader suitable to scan the serialized barcode on the object 105 being removed from the secured container 110. In some embodiments, the object 105 being removed by the individual can include wireless communication capability. For example, the object 105 can include WiFi or BlueTooth™ communication devices. In such embodiments, the object 105 can wirelessly communicate with the one or more sensors 105 or computing devices directly or by using a communication network 560 as described in greater detail below. In some embodiments, the object 105 can self-report its location in relation to the secured container 110 (e.g., inside or outside the secured container 110).

In some embodiments, the unique identifying code 103 can be a standard Universal Product Code (UPC) supplied by the manufacturer, such as a two-dimensional barcode, or the unique identifying code 103 can be an individualized barcode provided by the facility for each individual item.

The processor 155a can execute instructions to communicate with the second computing device 170 to determine whether an authorization associated with the computing device identifier was received for the removed objects within the time period. In some embodiments, the communication can occur in response to determining that the individual has taken at least one of the objects 105 from the secured container 110. In some embodiments, the second computing device 170 can generate the authorization associated with the computing device identifier. For example, the second computing device 170 can generate the authorization in response to receiving payment for the object 105 during a transaction where the computing device identifier is provided. As another example, the second computing device 170 can generate the authorization in response to receiving payment for the object 105 during a transaction where the unique identifying code for the object 105 is provided. In a further example, the second computing device 170 can generate the authorization in response to receiving payment for the object 105 during a transaction where the object 105 self-reports a location proximate to the second computing device.

In some embodiments, the second computing device 170 can be a point-of-sale terminal, payment terminal, or cash register. In some embodiments, the mobile computing device 160 can provide the computing device identifier to the second computing device 170 during a procedure for procuring payment for the removed object 105. For example, the mobile computing device 160 can provide the computing device identifier to the second computing device 170 through wireless communication such as near-field communication. In another embodiment, the mobile computing device 160 can display information related to the computing device identifier on the display, and the second computing device 170 can use an imaging device to read the displayed information. The second computing device 170 can then extract the computing device identifier from the displayed information. In some embodiments, the second computing device 170 can store the computing device identifier in a database 158c. In some embodiments, the second computing device 170 can include a sensor to identify the unique identifying code 103 associated with the object 105. In some embodiments, the mobile computing device 160 and the second computing device 170 do not require pre-registration of the individual.

In some embodiments, the mobile computing device 160 can provide the computing device identifier to the second computing device 170 in association with an indication that the individual does not wish to purchase the object 105. For example, the individual may wish to cancel a transaction associated with the object 105 and leave the object 105 within the facility. As a result, the second computing device 170 can generate the authorization associated with the computing device identifier and communicate the authorization to the first computing device 150. In some embodiments, the second computing device 170 can store the authorization in the database 158c.

The time period during which the authorization was or was not received can be static or variable in various embodiments. In some embodiments, the time period can be 30 minutes, 1 hour, 2 hours, 4 hours, 8 hours, or another suitable time period. In some embodiments, the time period can be longer than 8 hours. In accordance with various embodiments, the time period for one object 105a may be different than the time period for another object 105b. For example, the length of the time period may be inversely proportional to the value of the object. In some embodiments, the time period can begin at the moment the determination is made that one or more objects 105 have been removed. In some embodiments, the time period can begin at the moment the secured container 110 is re-secured by the lock after access had been granted to the individual.

In some embodiments, the first computing device 150 includes the alert system 152. The first computing device 150 can use the alert system 152 to issue an alert including the identifying information. In some embodiments, the first computing device 150 can issue the alert in response to determining that the authorization associated with the computing device identifier has not been received within the time period. In some embodiments, the alert system 152 provides the identifying information, such as the image or fingerprint information, to private security, law enforcement, or both.

In some embodiments, the alert system 152 can be separate from the first computing device 150 and the first computing device 150 and the alert system 152 can be communicatively coupled. For example, the first computing device 150 and the alert system 152 can communicate through a network environment as described in greater detail below with reference to FIG. 5.

In some embodiments, the first computing device 150, the mobile computing device 160, and the second computing device 170 can be communicatively coupled through a wired or wireless connection. In some embodiments, the first computing device 150 and the second computing device 170 can be portable or mobile.

Figure 2:
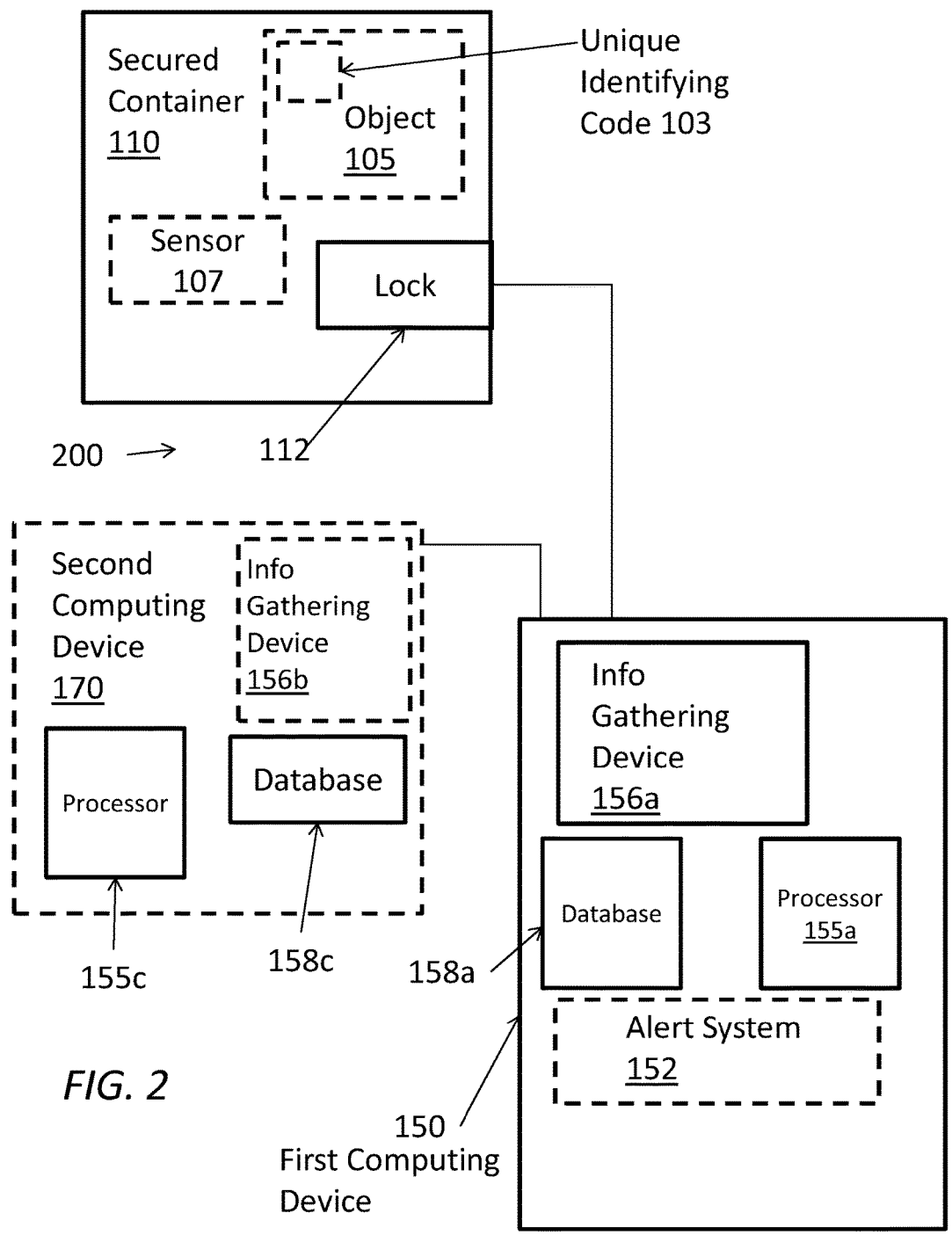
FIG. 2 illustrates a block diagram of a system to provide access to a secured container according to embodiments of the present disclosure.

FIG. 2 illustrates a block diagram of a system 200 to provide access to a secured container according to various embodiments of the present disclosure. The system 200 can include the container 110 secured by the lock 112 and the first computing device 150 communicatively coupled to the lock. In some embodiments, the system 200 can include the second computing device 170. The first computing device 150 can include the processor 155a, an information gathering device 156a, and the database 158a. In some embodiments, the first computing device 150 can include the alert system 152. The system 200 can provide access to the secured container 110 in exchange for receiving identifying information for the individual requesting access. The first computing device 150 can use the information gathering device 156a to obtain the identifying information for the individual. Thus, the first computing device 150 of system 200 does not need to communicate with the mobile computing device 160 to receive the identifying information as in the system 100 described above with reference to FIG. 1. The first computing device 150 can communicate with the second computing device 170 to determine if an authorization was received within a time period for objects 105 removed from the secured container 110. The system 200 can relay the identifying information as part of an alert if an authorization was not received within the time period.

In some embodiments, the secured container 110 encloses one or more objects 105. The secured container 110 may be substantially similar to that described above with reference to FIG. 1.

The processor 155a of the first computing device 150 can be configured to execute instructions to obtain identifying information for an individual seeking access to the secured container 110 using the information gathering device 156a. In some embodiments, the information gathering device 156a can include an imaging device or a biometric device. The imaging device can acquire identifying information in the form of an image of, or an image related to, the individual. The biometric device can include a fingerprint scanner, retinal scanner, or other suitable sensor to obtain biometric identifying information for the individual. In some embodiments, the processor 155a can execute instructions to validate the identifying information. For example, the processor 155a in some embodiments can execute an image analytics module to verify that the image includes features associated with a human. If the image does not pass validation, the processor 155a can notify the individual that additional identifying information is required.

The processor 155a can execute instructions to unlock the lock 105 securing the container 110 and to determine whether the individual has removed at least one of the objects 105 from the secured container 110. Execution of these instructions can be performed substantially in accordance with the description above with reference to FIG. 1.

The processor 155a can execute instructions to communicate with the second computing device 170 to determine whether an authorization associated with the individual was received for the removed objects 105 within the time period. In some embodiments, the instructions to communicate with the second computing device 170 can be executed upon determining that the individual has taken at least one of the objects 105 from the secured container 110. In some embodiments, the second computing device 170 can generate the authorization. For example, the second computing device can determine that payment has been received for the removed objects 105.

In accordance with various embodiments, the authorization can be associated with the individual by the first computing device 150 or the second computing device 170. For example, the second computing device 170 of some embodiments of the present disclosure can include an information gathering device 156b. In some embodiments, the information gathering device 156b can include an imaging device or a biometric device. The imaging device can acquire identifying information in the form of an image of, or an image related to, the individual. The biometric device can include a fingerprint scanner, retinal scanner, or other suitable sensor to obtain biometric identifying information for the individual.

In some embodiments, the information gathering device 156b can collect corroborating information for the individual. In some embodiments, the first computing device 156b can communicate with the second computing device 170 to receive the corroborating information and the authorization. In such embodiments, the processor 155a of the first computing device 150 can execute instructions to compare the identifying information with the corroborating information to corroborate that the individual at the second computing device 170 is the same individual associated with the identifying information. For example, the processor 155a can compare the identifying information and corroborating information to calculate a similarity score that represents a likelihood that the two sets of information correspond to the same individual. If the information is corroborated, the first computing device 150 can associate the individual with the authorization and determine that the authorization associated with the individual was received. If the information is not corroborated, the first computing device 150 can determine that the authorization associated with the individual was not received. In some embodiments, the first computing device 150 can then await the remainder of the time period to see if an authorization has been received. In some embodiments, the first computing device 150 can communicate that the authorization was not received to the second computing device 170. The second computing device 170 may then request additional corroborating information for the individual.

In some embodiments, the information comparison can be performed instead by a processor 155c of the second computing device 170. For example, the second computing device 170 can receive the identifying information from the first computing device 150, compare the identifying information and corroborating information as described above, and communicate the results of the comparison to the first computing device 150. Alternatively, if the information is corroborated, the second computing device 170 can associate the authorization with the individual, and communicate the authorization to the first computing device 150. If the information is not corroborated, the second computing device 170 can request additional corroborating information for the individual.

As an example for when the identifying information and corroborating information are fingerprints, the first computing device 150 or second computing device 170 can identify points on one or both of the identifying fingerprint and the corroborating fingerprint to identify swirls and loops. A comparison of these points on the fingerprint can verify whether the identifying information and the corroborating information were provided by the same person. When the identifying information and corroborating information are images, the first computing device 150 or the second computing device 170 can perform image analysis on one or both of the images. For example, a small section of each image can be selected that contains the face of the individual. Segments of the face can be selected such as the lips, nose, or jaw line. The shape of each of these segments and the distances therebetween can be analyzed. This analysis can be performed on the identifying information and the corroborating information and the results can be compared to verify that the same individual is depicted in the identifying information and the corroborating information.

The processor 155a can execute instructions to issue an alert including the identifying information using the alert system 152. In some embodiments, the alert can be issued upon determining that the authorization associated with the individual was not received within the time period. Execution of this instruction can be performed substantially in accordance with that described above in relation to FIG. 1. In various embodiments, the first computing system 150 can include the alert system 152 or the first computing system 150 can communicate with the alert system 152 through a networked environment as described in greater detail below with reference to FIG. 5.

Figure 3:
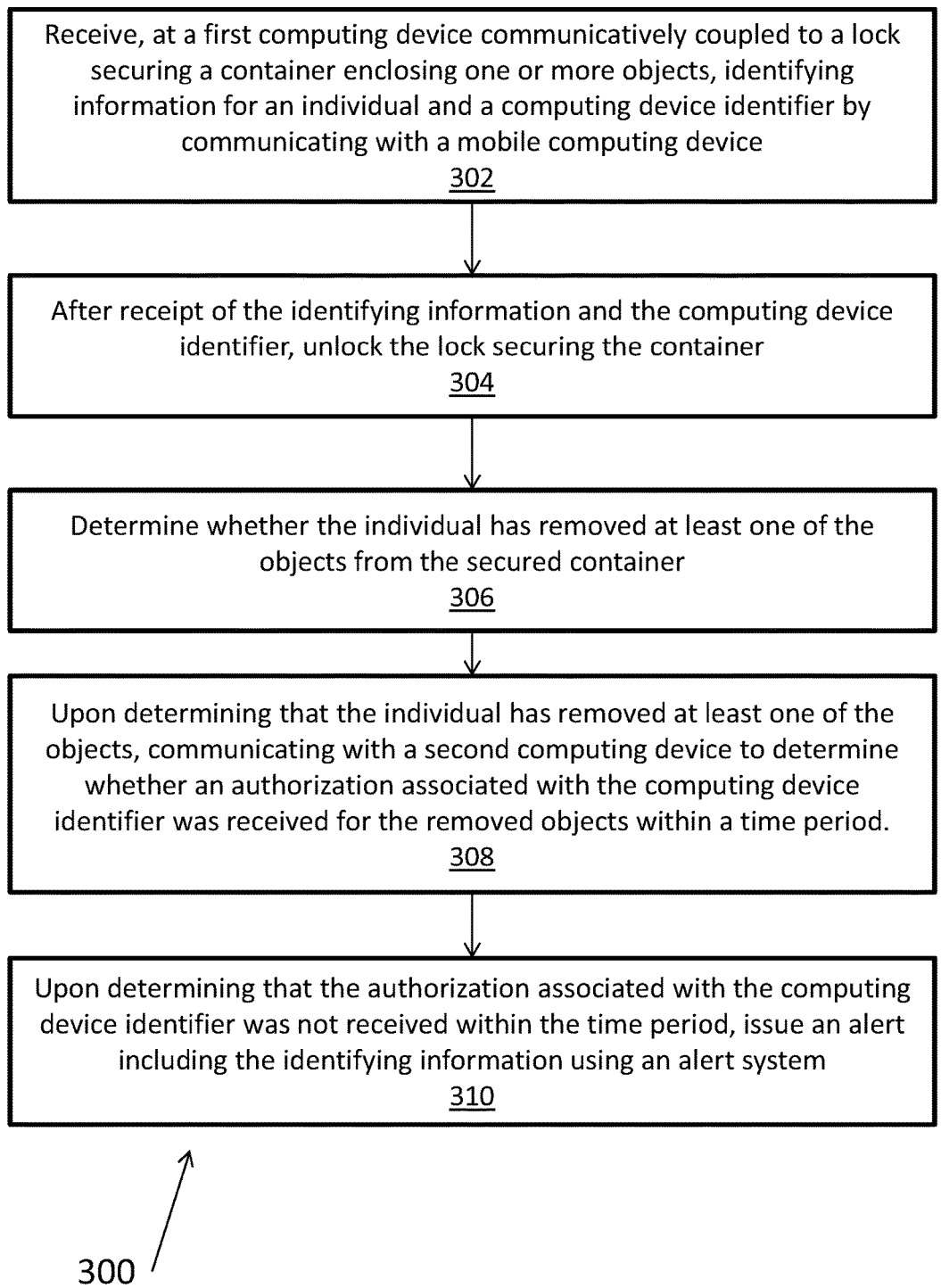
FIG. 3 illustrates a flowchart of a method of providing access to a secured container according to embodiments of the present disclosure.

FIG. 3 illustrates an exemplary flowchart of a method 300 for providing access to a secured container according to embodiments of the present disclosure. The method includes receiving, at a first computing device communicatively coupled to a lock securing a container enclosing one or more objects, identifying information for an individual and a computing device identifier by communicating with a mobile computing device (step 302). In some embodiments, the first computing system 150 can receive the identifying information and computing device identifier from the mobile computing device 160 as described above with reference to FIG. 1. The method includes unlocking the lock securing the container after receiving the identifying information and the computing device identifier (step 304). For example, the first computing device 150 can unlock the lock 112 securing the container 110 as described above with reference to FIG. 1.

The method also includes determining whether the individual has removed at least one of the objects from the secured container (step 306). For example, the first computing device 150 can use one or more sensors included in the secured container 110 to detect removal of an object 105 as described above with reference to FIG. 1. The method includes communicating with a second computing device to determine whether an authorization associated with the computing device identifier was received for the removed objects within a time period upon determining that the individual has taken at least one of the objects (step 308). For example, the first computing device 150 can communicate with the second computing device 170 to determine whether an authorization associated with the computing device identifier was received as described above with reference to FIG. 1.

The method includes issuing an alert including the identifying information using an alert system upon determining that the authorization associated with the computing device identifier was not received within the time period (step 310). For example, the first computing device 110 can issue an alert including the identifying information using the alert system 152 as described above with reference to FIG. 1.

Figure 4:
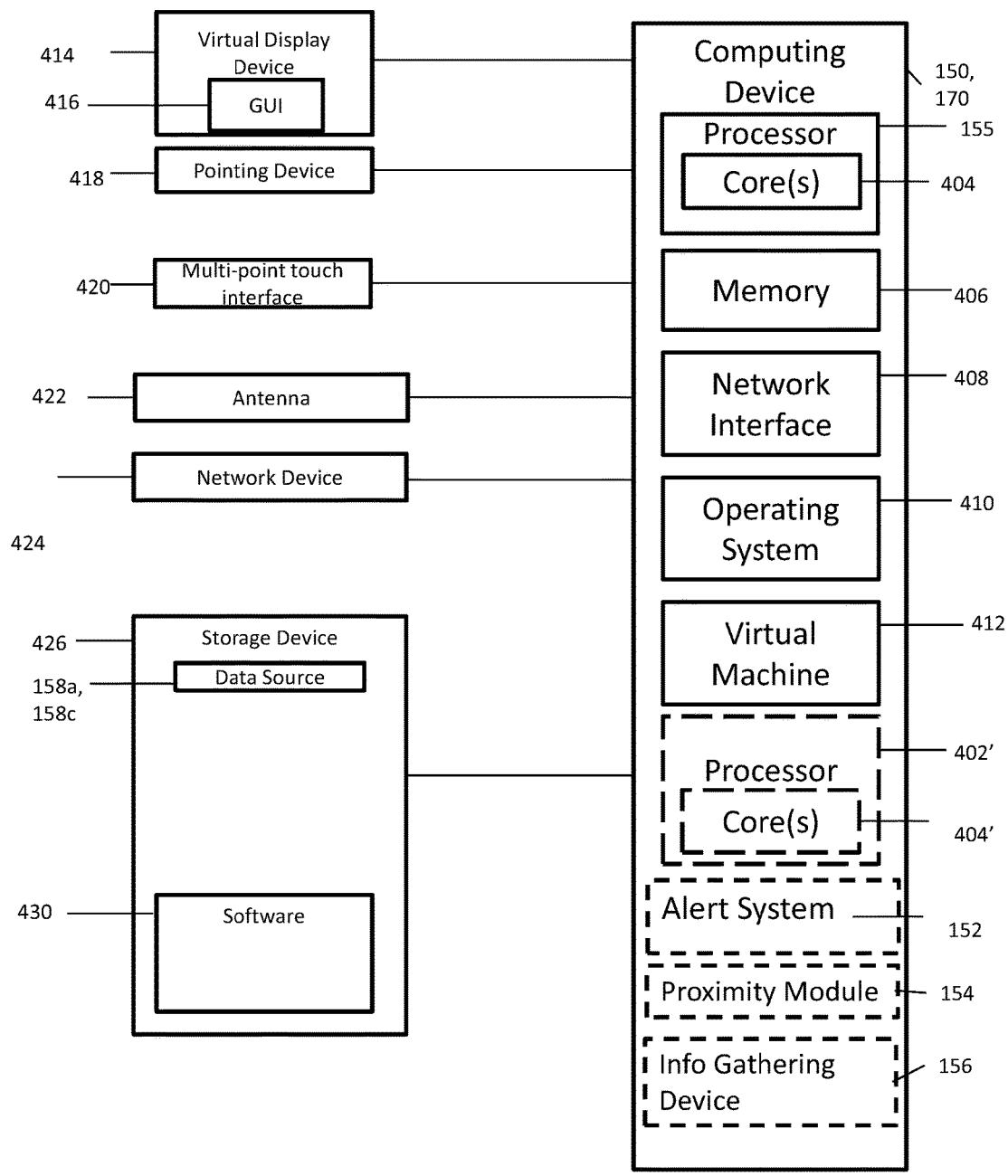
FIG. 4 illustrates an exemplary computing device for use with the systems and methods disclosed herein.

FIG. 4 is a block diagram of the example computing device 150, 170 for implementing exemplary embodiments of the present disclosure. The computing device 150, 170 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 150, 170 may store computer-readable and computer-executable instructions or software 430 for implementing exemplary operations of the computing device 150, 170. For example, the software 430 can include executable instructions to perform the operations as described above with reference to FIGS. 1, 2 and 3. The software 430 can also be stored in a storage system 426 as described below. The computing device 150, 170 also includes configurable and/or programmable processor 155 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 155 and processor(s) 402' may each be a single core processor or multiple core (404 and 404') processor. Either or both of processor 155 and processor(s) 402' may be configured to execute one or more of the instructions described in connection with first computing device 150, 170. In some embodiments, the processor 155 or processor 402' can be the processors 155a, 155c described above with reference to FIGS. 1 and 2.

Virtualization may be employed in the computing device 150, 170 so that infrastructure and resources in the computing device 150, 170 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 150, 170 through a visual display device 414, such as a computer monitor, which may display one or more graphical user interfaces 416, a multi touch interface 420 or a pointing device 418.

The computing device 150, 170 may also include one or more storage devices 426, such as a hard-drive, CD-ROM, or other computer readable media, for storing data and computer-readable instructions and/or software 430 that implement exemplary embodiments of the present disclosure. For example, exemplary storage device 426 can include databases 158a, 158c as described above with reference to FIGS. 1 and 2. The databases 158a, 158c may be updated manually or automatically at any suitable time to add, delete, and/or update one or more data items in the databases.

The computing device 150, 170 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 150, 170 can include one or more antennas 422 to facilitate wireless communication (e.g., via the network interface) between the computing device 150, 170 and a network and/or between the computing device 150, 170 and the secured container 110, the mobile computing device 160, or other computing devices. The network interface 408 may include a built-in network adapter, network interface card, PCMCIA network card, card bus network adapter, wireless network adapter, USB network adapter, modem or any other device suitable for interfacing the computing device 150, 170 to any type of network capable of communication and performing the operations described herein.

The computing device 150, 170 may run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 150, 170 and performing the operations described herein. In exemplary embodiments, the operating system 410 may be run in native mode or emulated mode. In an exemplary embodiment, the operating system 410 may be run on one or more cloud machine instances.

Figure 5:
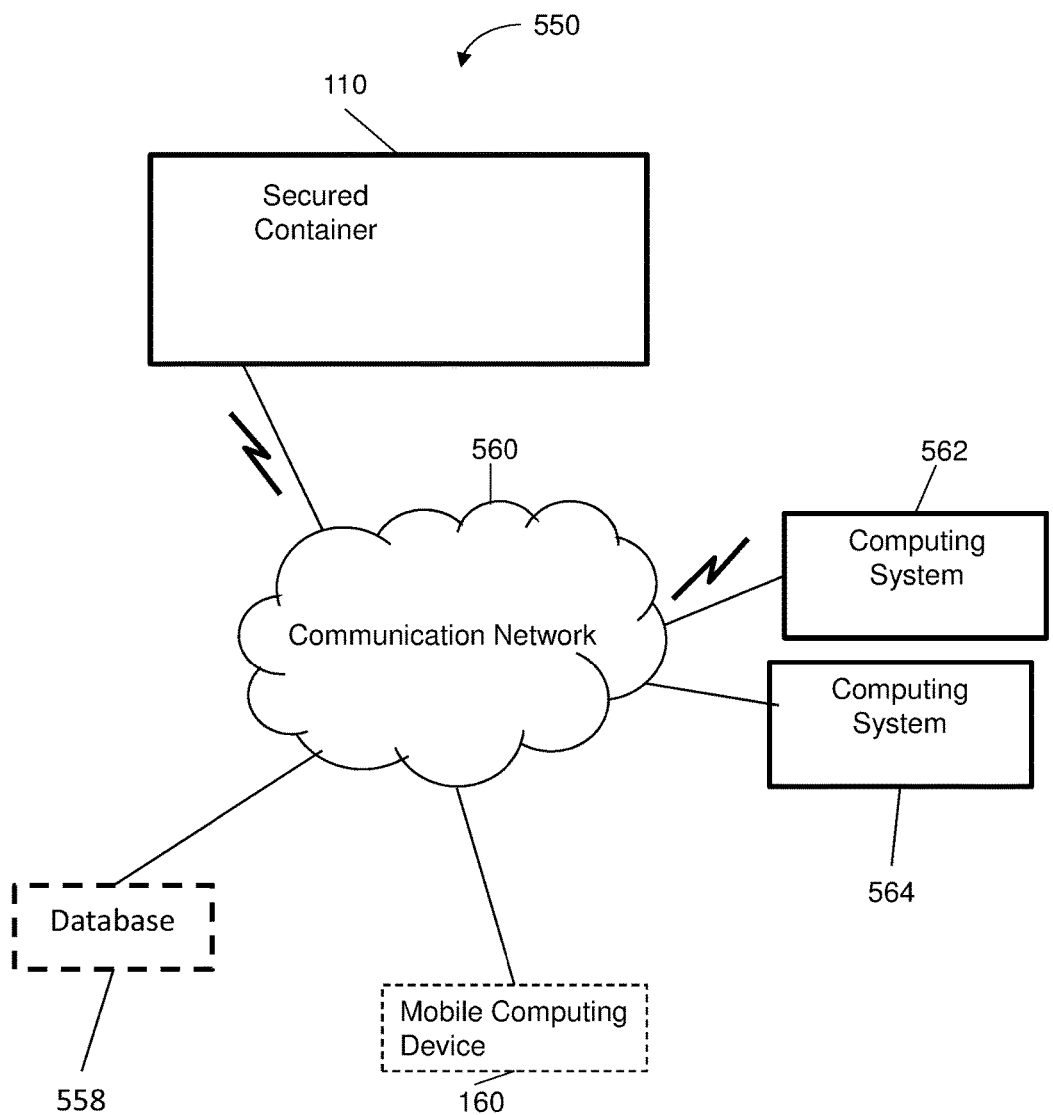
FIG. 5 illustrates a block diagram of an exemplary distributed secured container access system environment in accordance with embodiments of the present disclosure.

FIG. 5 is a block diagram of an exemplary distributed secured container access environment 550 in accordance with exemplary embodiments of the present disclosure. The environment 550 can include computing devices 562, 564 configured to be in communication with the secured container 110 via a communication network 560, which can be any network over which information can be transmitted between devices communicatively coupled to the network. For example, the communication network 560 can be the Internet, Intranet, virtual private network (VPN), wide area network (WAN), local area network (LAN), and the like. In some embodiments, the communication network 560 can be part of a cloud environment. In some embodiments, the environment 550 can include one or more mobile computing devices 160 that can be in communication with the secured container 110 and the computing devices 562, 564 via the communication network 560. The environment 550 can include at least one repository or database 558, which can be in communication with the secured container 110, the mobile computing device 160, and the computing devices 562, 564 via the communications network 560.

In exemplary embodiments, the one or more computing devices 562, 564 and one or more databases 558 can be implemented as computing devices (e.g., first computing device 150 or second computing device 170) or mobile devices (i.e., mobile computing device 160). In some embodiments, the one or more databases 558 can be the database 158a included in the first computing device 150 or the database 158c included in the second computing device 170. Those skilled in the art will recognize that the one or more databases 558 can be incorporated into the computing systems 562, 564 such that the computing devices 562, 564 can include one or more of the databases 558. In some embodiments, the database 558 can include computer-executable instructions or automated scripts that describe a technique for providing access to a secured container.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components, or steps that serve the same purpose. Moreover, while exemplary embodiments have been shown and described with references to particular embodiments thereof, those of ordinary skill in the art understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art recognizes that exemplary methods may include more or fewer steps than those illustrated in the exemplary flowcharts, and that the steps in the exemplary flowcharts may be performed in a different order than the order shown in the illustrative flowcharts.

The invention claimed is:

1. A system to provide access to a secured container in a facility comprising:
   a container secured by a lock and configured to enclose one or more objects;
   a first computing device communicatively coupled to the lock and including a processor configured to execute instructions to:
   communicate with a mobile computing device to receive identifying information for an individual seeking access to the secured container and a computing device identifier;
   after receipt of the identifying information and the computing device identifier, unlock the lock securing the container and begin a time period;
   determine whether the individual has removed at least one of the objects from the secured container;
   upon determining that the individual has taken at least one of the objects, communicate with a second computing device to determine whether an authorization associated with the computing device identifier was received for the removed objects before an end of the time period; and
   upon determining that the authorization associated with the computing device identifier was not received within the time period, issue an alert including the identifying information using an alert system.

2. The system of claim 1, wherein the first computing device, mobile computing device, and second computing device do not require pre-registration of the individual.

3. The system of claim 1, wherein the identifying information includes an image of the individual.

4. The system of claim 1, wherein the identifying information includes biometric data of the individual.

5. The system of claim 4, wherein the biometric data includes fingerprint information.

6. The system of claim 1, wherein the first computing device further comprises a proximity module to detect the presence of the mobile computing device to unlock the lock as the individual physically approaches the secured container.

7. The system of claim 1, wherein the second computing device includes a point of sale device.

8. The system of claim 1, wherein the mobile computing device includes a mobile communications device.

9. The system of claim 8, wherein the mobile communications device includes a smartphone or tablet computer.

10. The system of claim 1, wherein the secured container includes an enclosed box.

11. The system of claim 1, wherein issuing the alert using the alert system includes notifying law enforcement.

12. The system of claim 1, wherein the processor of the first computing device is configured to execute further instructions to:
   provide navigation information to the mobile computing device to guide the individual to the secured container within a facility.

13. A method of providing access to a secured container, comprising:
   receiving, at a first computing device communicatively coupled to a lock securing a container configured to enclose one or more objects, identifying information for an individual and a computing device identifier by communicating with a mobile computing device;
   after receipt of the identifying information and the computing device identifier, unlocking the lock securing the container and beginning a time period;
   determining whether the individual has removed at least one of the objects from the secured container;

upon determining that the individual has taken at least one of the objects, communicating with a second computing device to determine whether an authorization associated with the computing device identifier was received for the removed objects before an end of the time period; and upon determining that the authorization associated with the computing device identifier was not received within the time period, issuing an alert including the identifying information using an alert system.

14. The method of claim 13, wherein the first computing device, mobile computing device, and second computing device do not require pre-registration of the individual.

15. The method of claim 13, wherein receiving the identifying information comprises receiving an image of the individual, the identifying information including the image.

16. The method of claim 13, wherein receiving the identifying information comprises receiving biometric data for the individual, the identifying information including the biometric data.

17. The method of claim 16, wherein the biometric data includes fingerprint information.

18. The method of claim 13, wherein the step of unlocking the lock securing the container further comprises communicating, using a proximity module of the first computing device, with the second computing device as the individual physically approaches the secured container.

19. A system to provide access to a secured container comprising:

a container secured by a lock and configured to enclose one or more objects;

a first computing device communicatively coupled to the lock and including an information gathering device and a processor configured to execute instructions to:

obtain, using the information gathering device, identifying information for an individual seeking access to the secured container;

unlock the lock securing the container and begin a time period;

determine whether the individual has removed at least one of the objects from the secured container;

upon determining that the individual has taken at least one of the objects, communicate with a second computing device to determine whether an authorization associated with the individual was received for the removed objects before an end of the time period; and upon determining that the authorization associated with the individual was not received within the time period, issue an alert including the identifying information using an alert system.

20. The system of claim 19 wherein the information gathering device includes an imaging device.

21. The system of claim 19, wherein the information gathering device includes a fingerprint scanner.

* * * * *